(12) United States Patent  (10) Patent No.: US 11,227,605 B2
Grancharov et al.  (45) Date of Patent: Jan. 18, 2022

(54) VOICE-CONTROLLED MANAGEMENT OF USER PROFILES

(71) Applicant: Telefonaktiebolaget LM Ericsson (publ), Stockholm (SE)

(72) Inventors: Volodya Grancharov, Solna (SE); Tomer Amiaz, Tel Aviv (IL); Hadar Gecht, Ramat-HaSharon (IL); Harald Pobloth, Täby (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 12 days.

(21) Appl. No.: 16/644,531

(22) PCT Filed: Sep. 11, 2017

(86) PCT No.: PCT/EP2017/072700
§ 371 (c)(1),
(2) Date: Mar. 5, 2020

(87) PCT Pub. No.: WO2019/048062
PCT Pub. Date: Mar. 14, 2019

(65) Prior Publication Data
US 2020/0194006 A1  Jun. 18, 2020

(51) Int. Cl.
*G10L 17/02* (2013.01)
*G06F 17/18* (2006.01)
(Continued)

(52) U.S. Cl.
CPC .............. *G10L 17/02* (2013.01); *G06F 17/18* (2013.01); *G10L 15/08* (2013.01); *G10L 21/0308* (2013.01)

(58) Field of Classification Search
CPC ..... G10L 17/02; G10L 15/08; G10L 21/0308; G06F 17/18
See application file for complete search history.

(56) References Cited

U.S. PATENT DOCUMENTS 6,415,257 B1  7/2002 Junqua et al.
6,418,424 B1  7/2002 Hoffberg et al.
(Continued)

FOREIGN PATENT DOCUMENTS

EP   2048656 A1    4/2009
WO   200195625 A1  12/2001

OTHER PUBLICATIONS

Shirali-Shahreza, S. et al., "Parental Control Based on Speaker Class Verification", IEEE Transactions on Consumer Electronics, vol. 54 No. 3, Aug. 1, 2008, pp. 1244-1251, IEEE.
(Continued)

*Primary Examiner* — Sonia L Gay
(74) *Attorney, Agent, or Firm* — Coats & Bennett, PLLC

(57) ABSTRACT

A management of user profiles comprises calculating, for each speaker model of at least one speaker model, a confidence measure representing a probability that the speaker model represents a speaker of a cluster of audio segments. A user profile associated with the speaker model is updated based on a user preference assigned to the cluster of audio segments if the confidence measure calculated for the speaker model represents a probability that is higher than a target probability. The embodiments achieve an efficient user profile management in a voice-controlled context but without the need for any dedicated enrollment sessions to train speaker models.

17 Claims, 8 Drawing Sheets

(51) Int. Cl.
*G10L 15/08* (2006.01)
*G10L 21/0308* (2013.01)

(56) References Cited

U.S. PATENT DOCUMENTS

| | | | | |
|---|---|---|---|---|
| 7,024,366 | B1* | 4/2006 | Deyoe | G10L 15/22 |
| | | | | 704/246 |
| 7,620,547 | B2* | 11/2009 | Kompe | G10L 17/04 |
| | | | | 704/245 |
| 9,363,155 | B1 | 6/2016 | Gravino et al. | |
| 2004/0003392 | A1 | 1/2004 | Trajkovic et al. | |
| 2004/0193426 | A1 | 9/2004 | Maddux et al. | |
| 2007/0198264 | A1* | 8/2007 | Chang | G10L 17/22 |
| | | | | 704/250 |
| 2009/0119103 | A1 | 5/2009 | Gerl et al. | |
| 2012/0136658 | A1 | 5/2012 | Shrum, Jr. et al. | |
| 2012/0253811 | A1 | 10/2012 | Breslin et al. | |
| 2015/0154002 | A1 | 6/2015 | Weinstein et al. | |
| 2016/0291988 | A1 | 10/2016 | Zimmermann et al. | |
| 2017/0076727 | A1* | 3/2017 | Ding | G10L 17/00 |
| 2018/0166066 | A1* | 6/2018 | Dimitriadis | G10L 25/78 |
| 2019/0043493 | A1* | 2/2019 | Mohajer | G10L 15/1822 |

OTHER PUBLICATIONS

Reynolds, D. et al., "Robust Text-Independent Speaker Identification Using Gaussian Mixture Speaker Models", IEEE Transactions on Speech and Audio Processing, vol. 3 No. 1, Jan. 1, 1995, pp. 72-83, IEEE.

Reynolds, D., "Comparison of Background Normalization Methods for Text-Independent Speaker Verification", Eurospeech 1997, Sep. 22, 1997, pp. 1-4, ISCA.

Jin, Q. et al., "Speaker Segmentation and Clustering in Meetings", Interspeech 2004, Jan. 1, 2004, pp. 1-9, ISCA.

Mansikkaniemi, A., "Acoustic Model and Language Model Adaptation for a Mobile Dictation Service", Aalto University Master's Thesis, Feb. 3, 2010, Aalto University.

Obin, N. et al., "On Automatic Voice Casting For Expressive Speech: Speaker Recognition Vs. Speech Classification", 2014 IEEE International Conference on Acoustic, Speech, and Signal Processing (ICASSP), May 4, 2014, pp. 950-954, IEEE.

Booklet, T. et al., "Age and Gender Recognition For Telephone Applications Based on GMM Supervectors and Support Vector Machines", 2008 IEEE International Conferences on Acoustics, Speech and Signal Processing, Mar. 31, 2008, pp. 1605-1608, IEEE.

* cited by examiner

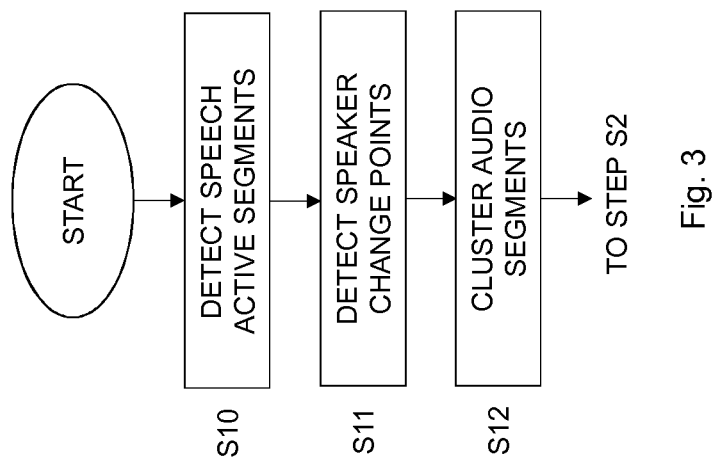
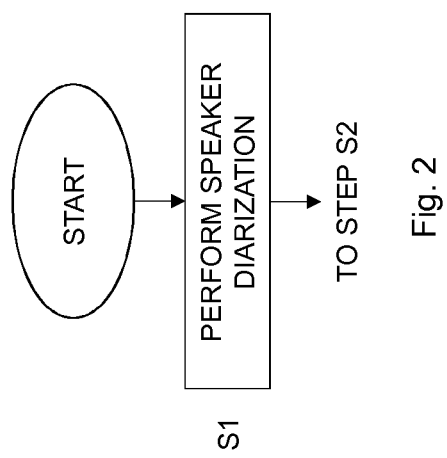
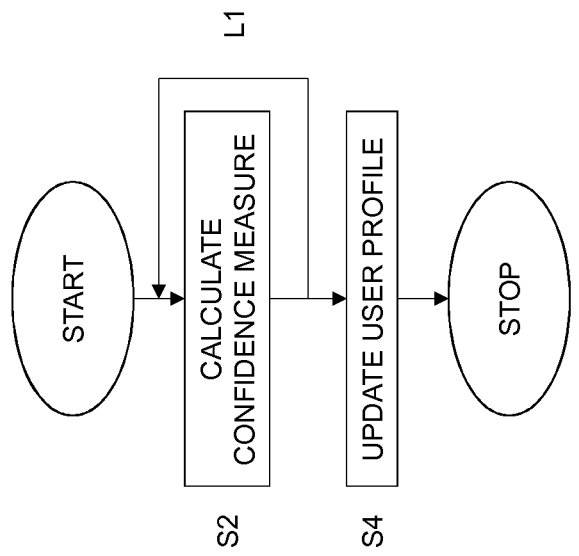

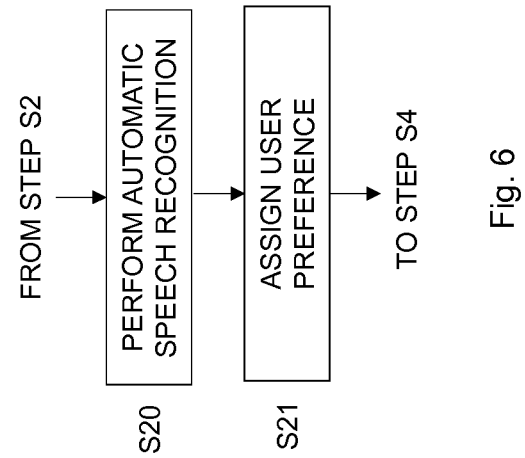
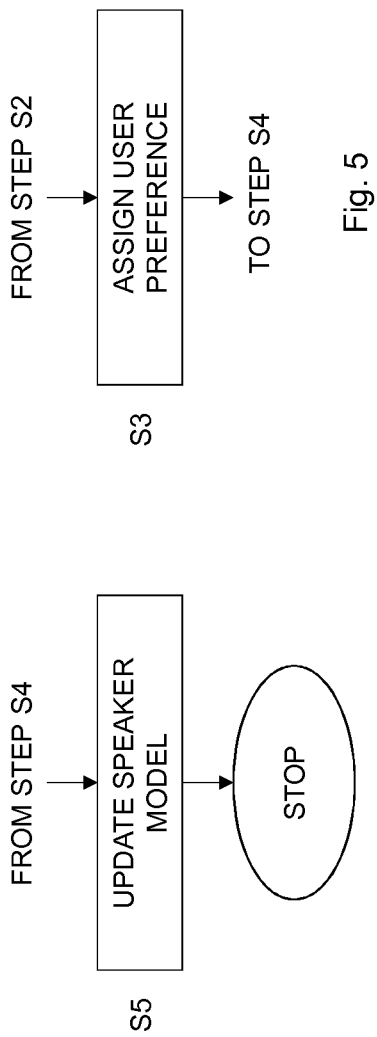

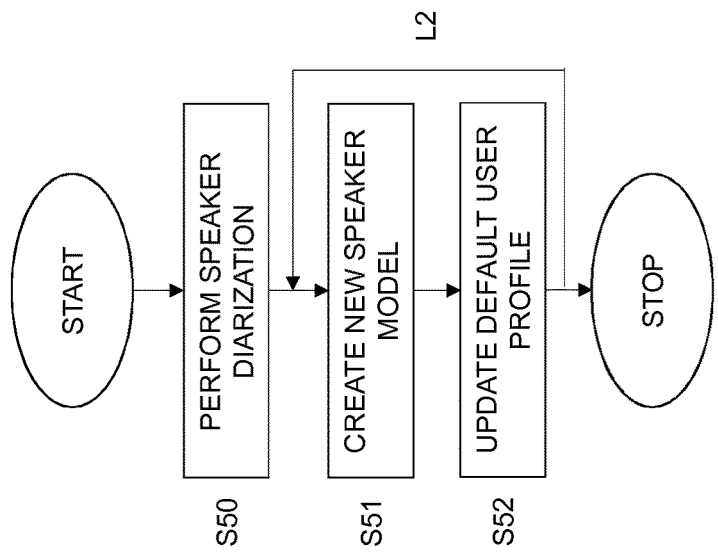
Fig. 9
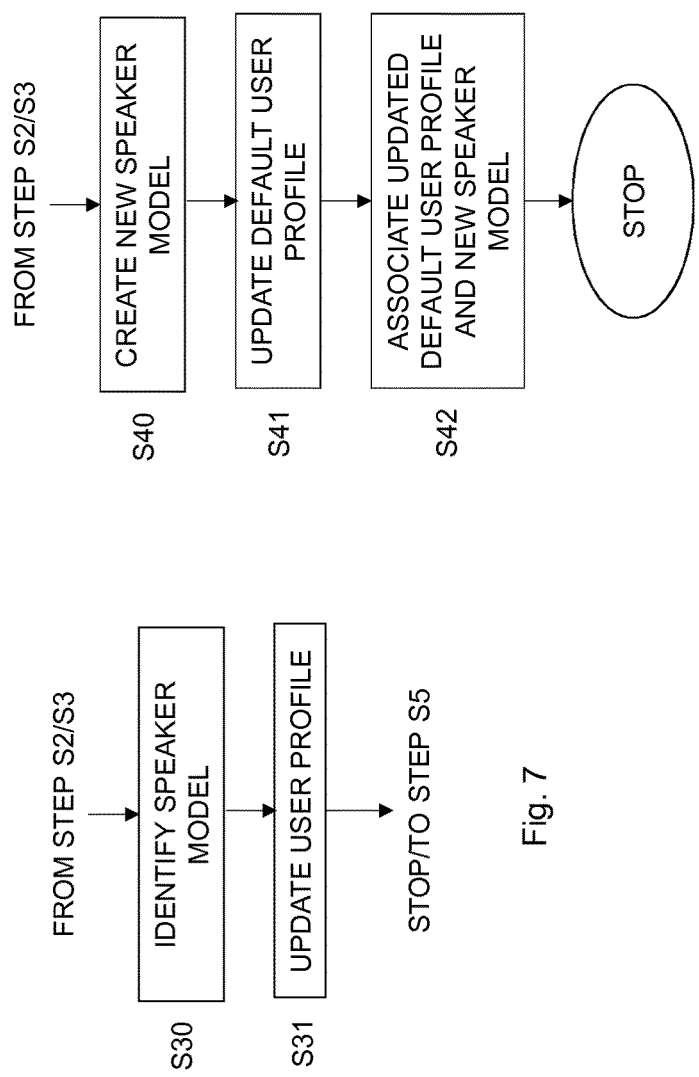
Fig. 8
Fig. 7

VOICE-CONTROLLED MANAGEMENT OF USER PROFILES

TECHNICAL FIELD

The present embodiments generally relate to managing user profiles, and in particular to voice-controlled management of user profiles.

BACKGROUND

Over the last few years automatic speech recognition (ASR) algorithms have entered the user equipment space. This technology fusion enables hands free consumer control over the user equipment, such as set-top boxes, using just spoken commands. In addition to simple control, nowadays users can interact with the user equipment, request content related information, perform searches, and receive content recommendations.

To enable voice adaptation of the user equipment, the users' voices are registered in an enrollment session. From the users' point of view the enrollment session is an annoying and artificial requirement, as each user has to read out loud text to train the algorithms.

Another problem with the typical enrollment session is that it can rarely capture the variability in the users' voices as well as the variability in the acoustic background environment during actual operation or use of the user equipment. This has direct impact on the reliability of the trained algorithms.

US 2009/0119103 discloses a method that automatically recognizes speech received through an input. The method accesses one or more speaker-independent speaker models. The method detects whether the received speech input matches a speaker model according to an adaptable predetermined criterion. The method creates a speaker model assigned to a speaker model set when no match occurs based on the input.

WO 01/95625 discloses a method and system of speech recognition presented by a back channel from multiple user sites within a network supporting cable television and/or video delivery.

There is still need for improvements within the field of voice-controlled user equipment, and in particular with regard to enabling voice-controlled management of user profiles in user equipment, such as set-top boxes. There is in particular a need for achieving such voice-controller user profile management without any enrollment sessions.

SUMMARY

It is a general objective to provide a voice-controlled management of user profiles suitable for usage in a home environment.

This and other objectives are met by embodiments as disclosed herein.

An aspect of the embodiments relates to a method of managing user profiles. The method comprises calculating, for each speaker model of at least one speaker model, a confidence measure representing a probability that the speaker model represents a speaker of a cluster of audio segments. The method also comprises updating a user profile associated with the speaker model based on a user preference assigned to the cluster of audio segments if the confidence measure calculated for the speaker model represents a probability that is higher than a target probability.

Another aspect of the embodiments relates to a method of managing user profiles. The method comprises performing speaker diarization on an audio stream to form at least one cluster of audio segments. Each cluster of audio segments comprises speech of a single speaker. The method also comprises creating, for each cluster of audio segments of the at least one cluster of audio segments, a new speaker model representing or modelling a speaker of the cluster of audio segments. The method further comprises updating, for each cluster of audio segments of the at least one cluster of audio segments, a default user profile based on a user preference assigned to the cluster of audio segments.

A further aspect of the embodiments relates to a device for managing user profiles. The device is configured to calculate, for each speaker model of at least one speaker model, a confidence measure representing a probability that the speaker model represents a speaker of a cluster of audio segments. The device is also configured to update a user profile associated with the speaker model based on a user preference assigned to the cluster of audio segments if the confidence measure calculated for the speaker model represents a probability that is higher than a target probability.

Another aspect of the embodiments relates to a device for managing user profiles. The device comprises a calculating module for calculating, for each speaker model of at least one speaker model, a confidence measure representing a probability that the speaker model represents a speaker of a cluster of audio segments. The device also comprises an updating module for updating a user profile associated with the speaker model based on a user preference assigned to the cluster of audio segments if the confidence measure calculated for the speaker model represents a probability that is higher than a target probability.

Yet another further aspect of the embodiments relates to a device for managing user profiles. The device is configured to perform speaker diarization on an audio stream to form at least one cluster of audio segments. Each cluster of audio segments comprises speech of a single speaker. The device is also configured to create, for each cluster of audio segments of the at least one cluster of audio segments, a new speaker model representing or modelling a speaker of the cluster of audio segments. The device is further configured to update, for each cluster of audio segments of the at least one cluster of audio segments, a default user profile based on a user preference assigned to the cluster of audio segments.

Another aspect of the embodiments relates to a device for managing user profiles. The device comprises a diarization module for performing speaker diarization on an audio stream to form at least one cluster of audio segments. Each cluster of audio segments comprises speech of a single speaker. The device also comprises a creating module for creating, for each cluster of audio segments of the at least one cluster of audio segments, a new speaker model representing or modelling a speaker of the cluster of audio segments. The device further comprises an updating module for updating, for each cluster of audio segments of the at least one cluster of audio segments, a default user profile based on a user preference assigned to the cluster of audio segments.

A further aspect of the embodiments relates to a computer program comprising instructions, which when executed by at least one processor, cause the at least one processor to calculate, for each speaker model of at least one speaker model, a confidence measure representing a probability that the speaker model represents a speaker of a cluster of audio segments. The at least one processor is also caused to update a user profile associated with the speaker model based on a user preference assigned to the cluster of audio segments if the confidence measure calculated for the speaker model represents a probability that is higher than a target probability.

Another aspect of the embodiments relates to a computer program comprising instructions, which when executed by at least one processor, cause the at least one processor to perform speaker diarization on an audio stream to form at least one cluster of audio segments. Each cluster of audio segments comprises speech of a single speaker. The at least one processor is also caused to create, for each cluster of audio segments of the at least one cluster of audio segments, a new speaker model representing or modelling a speaker of the cluster of audio segments. The at least one processor is further caused to update, for each cluster of audio segments of the at least one cluster of audio segments, a default user profile based on a user preference assigned to the cluster of audio segments.

A related aspect of the embodiments defines a carrier comprising a computer program according to above. The carrier is one of an electronic signal, an optical signal, an electromagnetic signal, a magnetic signal, an electric signal, a radio signal, a microwave signal, or a computer-readable storage medium.

The embodiments achieve an efficient voice-controlled user profile management suitable for home environment. The embodiments reliably update user profiles if the identity of the speaker can be determined accurately. The update of user profiles and the updating of speaker models occur during usage and without the need for any dedicated enrollment session.

BRIEF DESCRIPTION OF THE DRAWINGS

The embodiments, together with further objects and advantages thereof, may best be understood by making reference to the following description taken together with the accompanying drawings, in which:

FIG. 1 is a flow chart illustrating a method of managing user profiles according to an embodiment;

FIG. 2 is a flow chart illustrating an additional, optional step of the method shown in FIG. 1 according to an embodiment;

FIG. 3 is a flow chart illustrating an embodiment of performing speaker diarization;

FIG. 4 is a flow chart illustrating an additional, optional step of the method shown in FIG. 1 according to another embodiment;

FIG. 5 is a flow chart illustrating an additional, optional step of the method shown in FIG. 1 according to a further embodiment;

FIG. 6 is a flow chart illustrating an embodiment of assigning user preference;

FIG. 7 is a flow chart of updating user profile according to an embodiment;

FIG. 8 is a flow chart illustrating additional, optional steps of the method shown in FIG. 1 according to an embodiment;

FIG. 9 is a flow chart illustrating a method of managing user profiles according to another embodiment;

DETAILED DESCRIPTION

Figure 10:
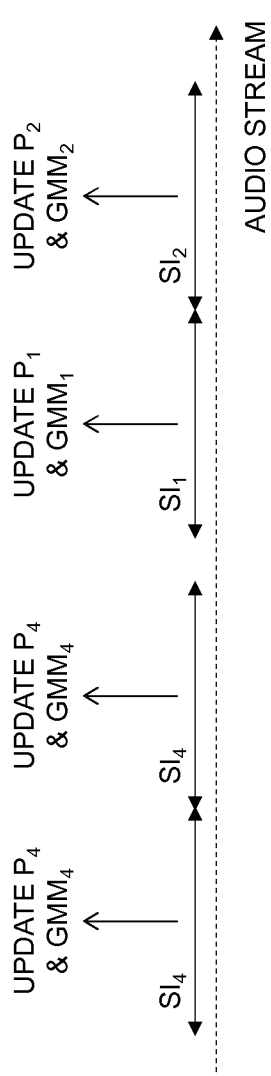
FIG. 10 schematically illustrates a speaker diarization approach for collecting user preferences and updating user profiles and speaker models according to an embodiment.

The present embodiments generally relate to managing user profiles, and in particular to voice-controlled management of user profiles.

In the evolution of interaction between user equipment and home users towards voice-controlled user interfaces two types of systems are the main drivers. One is to understand what is being said. This is achieved by means of automatic speech recognition (ASR) and sub-sequent natural language processing (NLP) and natural language understanding (NLU) that enable fast voice control and search. The other is to understand who said it, which is achieved by means of speaker recognition (SR).

Extending user equipment, such as set-top boxes, with SR capabilities has two main advantages. The first one is using voice biometrics as alternative and/or additional security layers to limit access to information and/or services to authorized users identified by means of SR. The second one is using the users' voices for intelligent profiling, i.e., user profile management. For these reasons, a robust SR optimized for the acoustic environment and the voices of the family members is highly desirable.

Speaker recognition, also referred to as voice recognition, is the identification of a speaker from voice characteristics. Speaker recognition uses the acoustic features of speech, i.e., a so-called speaker model, that have been found to differ between individuals. The speaker model reflects both anatomy, e.g., size and shape of the vocal tract, and learned behavioral patterns, e.g., voice pitch, and speaking style. A speaker recognition process is a pattern recognition process. The various technologies used to process and store voice prints include frequency estimation, hidden Markov models (HMMs), Gaussian mixture models (GMMs), pattern matching algorithms, neural networks, matrix representation, vector quantization and decision trees.

Previous SR solutions typically use a so-called enrollment session, in which each user has to read out a predefined text in order to train the SR algorithm and build a speaker model. Such enrollment sessions have inherent problems in that they can seldom capture the variability in the users' voices. Most users furthermore have different voice characteristics when reading test out loud as compared to speaking freely. Another problem with enrollment sessions is that the acoustic environment during the enrollment session is typically different from the regular environment when there can be other talking family members close and other background noise. In addition to these shortcomings of using enrollment sessions, the enrollment session is most often an annoying and artificial requirement for the users.

The present embodiments enable intelligent user profiling and user profile management in a voice-controlled context without the need for enrollment session to train a SR algorithm and build speaker models. This is achieved through continuous learning of the users' voices, such as based on speaker diarization, and continuous adaptation of user profiles. By avoiding the enrollment session and instead continuously updating the SR algorithm and the speaker models based on the users' voices, the embodiments are more user friendly and at the same time more robust due to more accurate modelling of voices and acoustic environment variability.

A further advantage of the embodiment is that the learning of the users' voices and preferences associated with those voices can be run in the background and may thereby be completely invisible to the user.

FIG. 1 is a flow chart illustrating a method of managing user profiles according to an embodiment. The method comprises calculating, in step S2, a confidence measure representing a probability that a speaker model represents a speaker of a cluster of audio segments. This calculation of confidence measure is performed for each speaker model of at least one speaker model, which is represented by the line L1 in the figure. A following step S4 comprises updating a user profile associated with the speaker model based on a user preference assigned to the cluster of audio segments if the confidence measure calculated for the speaker model represents a probability that is higher than a target probability.

Hence, the embodiments comprise calculating confidence measures for each speaker model available to a SR algorithm, module or engine. Each such confidence measure then represents a respective probability that the speaker model represents or models the speaker of the cluster of audio segments. In other models, a confidence measure represents a probability that a speaker model models the voice characteristics of a speaker that is currently speaking during the cluster of audio segments.

A confidence measure thereby reflects the reliability of recognizing the cluster of audio segments as comprising speech of a particular speaker, the voice characteristics of which are modelled by a speaker model.

The calculation of the confidence measure in step S2 is preferably performed for each speaker model available to the SR algorithm.

The following step S4 comprises performing a decision based on a comparison of a confidence measure calculated in step S2 and a threshold value. Thus, if the calculated confidence measure represents a probability that is higher than a target probability then a user profile associated with the speaker model is updated in step S4 based on user preferences assigned to the cluster of audio segments.

Hence, in a preferred embodiment any updating of a user profile associated with a speaker model, and thereby of a speaker or user, is conditioned on that the SR algorithm can reliably recognize the speaker as determined based on the calculated confidence measure, and in more detail determined based on the comparison of the probability and the target probability.

The conditional updating of user profiles means that the user profile will accurately reflect the true preferences of a user. The comparison between the target probability and the probability represented by the calculated confidence measure thereby effectively reduces the risk of updating the user profile of a given user with the preferences of another user.

This further means that over time when different users employ voice control to control a user equipment, more and more user preferences are collected and thereby the user profiles of the different users can be automatically and reliably updated to reflect the true preferences of the respective users.

This conditional update of user profiles can thereby be run automatically and without any need for enrollment sessions to generate the speaker models, which will be further described herein.

FIG. 2 is a flow chart illustrating an additional, optional step of the method shown in FIG. 1. This step S1 comprises performing speaker diarization on an audio stream to form at least one cluster of audio segments. Each such cluster of audio segments then comprises speech of a single speaker. The method then continues to step S2 in FIG. 1.

Thus, an audio stream is processed in a speaker diarization to segment the audio stream into clusters of audio segments comprising speech of a single speaker. At least one confidence measure is then calculated for each such cluster of audio segments in step S2.

FIG. 3 is a flow chart illustrating an embodiment of performing speaker diarization. This embodiment comprises detecting, in step S10, speech active segments from the audio stream. A following step S11 comprises detecting speaker change points in the speech active segments to form audio segments of a single speaker. The audio segments of a same single speaker are then clustered in step S12 to form the at least one cluster of audio segments. The method then continues to step S2 in FIG. 1.

Generally, speaker diarization is the process of partitioning an input audio stream into homogenous audio segments and further grouping those segments based on their similarity. A homogenous audio segment is an audio segment comprising speech of a single speaker. Speaker diarization enhances the readability of an automatic speech transcription by structuring the audio stream into homogenous audio segments. Speaker diarization is a combination of speaker segmentation and speaker clustering. Speaker segmentation aims at finding speaker change points in an audio stream, whereas speaker clustering aims at grouping together audio segments on the basis of speaker characteristics.

In speaker diarization one of the most popular methods is to use a GMM to model each of the speakers, and assign the corresponding audio frames for each speaker with the help of a HMM. There are two main kinds of clustering scenario. The first one is by far the most popular and is called Bottom-Up. The algorithm starts in splitting the full audio content in a succession of clusters and progressively tries to merge the redundant clusters in order to reach a situation where each cluster corresponds to a real speaker. The second clustering strategy is called Top-Down and starts with one single cluster for all the audio data and tries to split it iteratively until reaching a number of clusters equal to the number of speakers.

For instance, speech active segments from the incoming audio stream are detected by means of a voice activity detector (VAD). Next, a set of feature vectors modeling short-term frequency characteristics of the audio waveform are extracted from the speech active segments. One commonly used representation of such feature vectors is Mel-frequency cepstral coefficients (MFCCs), typically extracted every 10 ms. Changes of the statistics of the feature sets, belonging to the left or right side of a sliding window of size a few seconds, are used to detect potential speaker change points in the middle of the sliding window.

Audio segments formed in the speaker change detection are initially clustered, e.g., by means of a k-means clustering algorithm, to form an initial voice partitioning. With accumulation of more audio samples a GMM may be used to model the distribution of features for each individual voice. Once the GMMs for individual speakers are available, blind speaker diarization is not required and new feature vectors can be tested against each speaker model. The best matching speaker model is selected to determine the speaker identity.

More information about speaker diarization can be found in Jin et al., Speaker segmentation and clustering in meetings, In Proceedings of the 8th International Conference on Spoken Language Processing, Jeju Island, Korea, 2004.

The output of the speaker diarization is, thus, at least one cluster of audio segments comprising speech of a single speaker.

FIG. 4 is a flow chart illustrating an additional, optional step of the method shown in FIG. 1. The method continues from step S4 in FIG. 1. A next step S5 comprises updating the speaker model based on the cluster of audio segments if the confidence measure calculated from the speaker model represents a probability that is higher than the target probability.

In FIG. 4, step S5 has been illustrated as being performed after step S4 in FIG. 1. In other embodiments, step S5 is performed before step S4, or steps S4 and S5 are performed at least partly in parallel.

Thus, in these embodiments the method also comprises a conditional update of a speaker model in addition to a conditional update of a user profile. Thus, if the SR algorithm is able to reliably identify the speaker of a cluster of audio segments, the user profile and the speaker model of that speaker are updated in steps S4 and S5.

The update of the speaker model is preferably performed by updating the setting of the speaker models based on feature vectors calculated for the cluster of audio segments as mentioned in the foregoing. A speaker recognition could use a GMM-based algorithm to model the distribution of feature vectors, such as MFCCs, and optionally fundamental frequency (pitch) to determine speaker identities and calculate corresponding confidence measures. More information of speaker recognition can be found in Reynolds and Rose, Robust text-independent speaker identification using Gaussian mixture speaker models, IEEE Transactions on speech and audio processing, 1995, 3(1): 72-83. Accordingly, feature vectors, such as MFCCs, and fundamental frequency derived for the cluster of audio segments in the speaker diarization can be used to update a GMM model of the speaker.

As mentioned in the foregoing, the conditional update of the user profile is performed based on user preference assigned to the cluster of audio segment. Accordingly, in an embodiment the method comprises an additional, optional step S3 as shown in FIG. 5. The method continues from step S2 in FIG. 1. A next step S3 comprises assigning the user preference to the cluster of audio segments. The method then continues to step S4 in FIG. 1.

The assignment of user preferences to clusters of audio segments is preferably performed by means of automatic speech recognition as shown further in FIG. 6, which is a flow chart illustrating an embodiment of this assigning of user preference. The method continues from step S2 in FIG. 1. A next step S20 comprises performing automatic speech recognition on the cluster of audio segments to identify the user preference. A next step S21 comprises assigning the identified user preference to the cluster of audio segments. The method then continues to step S4 in FIG. 1.

The cluster(s) of audio segments output from the speaker diarization is(are) also input to an automatic speech recognition in order to analyze what is said by the speaker(s) for the purpose of identifying any user preferences.

Automatic speech recognition uses an acoustic model (AM) and a language model (LM) in speech recognition.

The acoustic model represents the relationship between an audio signal and the phenomes or other linguistic units that make up the speech. An acoustic model is a statistical model that estimates the probability that a certain phoneme or sub-phoneme has been uttered in an audio segment. Non-limiting, but illustrative examples of such models include GMM, HMMs, neural networks with a softmax output layer, etc. Different methods are used for doing speaker adaptation of these models. Examples of such methods are vocal tract length normalization (VTLN), maximum a posteriori (MAP) adaptation of HMM/GMM parameters, maximum likelihood linear regression (MLLR) of Gaussian parameters and weighted speaker cluster approaches, which use an interpolated model to represent the current speaker.

A language model is a statistical model that estimates the probabilities of a word following a short sequence of words. These are called n-grams, where a 1-gram gives the probability of a word without taking into consideration the previous word before it. A 2-gram gives the probability of a word given the previous word before it, a 3-gram gives the probability of a word given the two previous words before it, etc. Language models are adapted to different contexts by compiling n-gram models on text material from the different contexts. To obtain usable language models requires huge amounts of text material, especially for the higher order n-grams. When generating n-gram probabilities through the maximum likelihood estimates, the estimates for n-grams that are seen in the training text tend to be too high and the estimates for the n-grams that are not seen too low. This imbalance is often corrected by taking some probability mass from the seen events and redistribute it to all the unseen events. This is called language model smoothing. More information of AM and LM adaptation can be found in Mansikkaniemi, Acoustic Model and Language Model Adaptation for a Mobile Dictation Service, Master's thesis, Aalto University, 2010.

Thus, the automatic speech recognition tries to match sounds with word sequences. The language model provides context to distinguish between words and phrases that sound similar.

The output of the automatic speech recognition is the identified user preference. The identified user preference is then used to update the user profile in step S4 if, and preferably only if, the confidence measure calculated for the speaker model represents a probability that is higher than the target probability.

Non-limiting, but illustrative, examples of user preferences include a genre of a media, such as genre of music or video; a name of a singer or band; a name of an actor or actress; a name of a director; a name of a sport team or athlete; a web site address; a user equipment setting; etc.

For instance, assume a simple example where a user profile comprises movie genre and music genre. The movie genre could be either comedy, action, drama, thriller or sci-fi, whereas the music genre is one of rock, pop, classical, country and rap. A newly created user profile would probably set equal weights to these alternatives, i.e., P=[{comedy, action, dram, thriller, sci-fi}, {rock, pop, classical, country, rap}]=[{0.2, 0.2, 0.2, 0.2, 0.2}, {0.2, 0.2, 0.2, 0.2, 0.2}]. However, as a given user uses voice control to select movies and music the ASR algorithm identifies the genre of the movie and music, such as based on a selected title of a movie, name of a band or artist, title of a tune and/or based on a genre classification associated with a selected movie or music, and the SR algorithm identifies the identity of the speaker to update his/her user profile. If the user is mainly interested in sci-fi and action movies and only listens to rock music the updated user profile may over time instead be P=[{0.05, 0.4, 0.1, 0.05, 0.4}, {1, 0, 0, 0, 0}].

In an embodiment, step S2 of FIG. 1 comprises calculating, for each speaker model of multiple, i.e., at least two, speaker models, a confidence measure representing a probability that the speaker model represents the speaker of the cluster of audio segments. In this embodiment, step S4 of FIG. 1 is preferably performed as shown in FIG. 7. This embodiment thereby comprises identifying, in step S30, a speaker model of the multiple speaker models for which the calculated confidence measure represents a highest probability among the calculated confidence measures. A next step S31 comprises updating a user profile associated with the identified speaker model based on the user preference assigned to the cluster of audio segments if the confidence measure calculated for the identified speaker model represents a probability that is higher than the target probability.

The method then ends or continues to step S5 in FIG. 4. In the latter case, step S5 preferably comprises updating the identified speaker model based on the cluster of audio segments if the confidence measure calculated for the identified speaker model represents a probability that is higher than the target probability.

Hence, in this embodiment there is a group or set of available users, such as the family members of a user equipment. In such a case, each user has a respective speaker model representing the voice characteristics of a user. This means that a respective confidence measure is calculated for each speaker model and thereby for each user. The confidence measure that represents the highest probability that the cluster of audio segment comprises speech of a given user from the set of users is then selected.

For instance, assume a set of four users or family members. In such a case, the SR algorithm has access to four speaker models, $S_1, S_2, S_3, S_4$, and four confidence measures $C_1, C_2, C_3, C_4$ are calculated in step S2. Step S30 then identifies one of these four speaker models and in more detail selects the speaker model that represents the highest probability with regard to that the cluster of audio segment comprising speech of that particular user.

Thus, in a typical implementation the SR algorithm uses the speaker models for identifying the speaker of the cluster of audio segment. Each such speaker model outputs a respective confidence measure $C_1, C_2, C_3, C_4$ representing a probability that the cluster of audio segment comprises speech of the speaker, the voice of which the given speaker model represents or models. In a typical case, a confidence measure can range from a value of zero representing minimum probability up to one representing maximum probability that the cluster of audio segment comprises speech of a user. This range should merely be seen as an illustrative, but non-limiting, example of values for the confidence measures. For instance, in other cases, the value zero could represent maximum probability whereas the value one represent minimum probability. Another example could be to have unbounded confidence measures, such as minimum probability is represented by $-\infty$ (negative infinity) and 0 could represent maximum probability. Or more generally, the value X representing minimum probability (or maximum probability) and the value Y representing maximum probability (or minimum probability), wherein X<Y.

In a typical case, the sum of the confidence measures is equal to the value representing maximum probability, such as one, e.g., $\Sigma_{i=1}^{4} C_i = 1$. For instance, assume that the SR algorithm calculates the following confidence measures $C_1=0.08, C_2=0.73, C_3=0.11$ and $C_4=0.08$. In this illustrative example, the confidence value $C_2$ for the second speaker model $S_2$ represents the highest probability and is thereby identified in step S30.

In this example, the second speaker model $S_2$ is identified or selected in step S30 since its calculated confidence measure $C_2$ represents the highest probability among the calculated confidence measures $C_1, C_2, C_3, C_4$. The probability represented by this confidence measure is then compared to the target probability T. If the probability is higher than the target probability, such as $C_2>T$, then the user profile $P_2$ associated with the identified speaker model $C_2$ is updated based on the user preference assigned to the cluster of audio segments, i.e., $P_2$=function(user preference), wherein function(.) represents updating of the user profile.

In a preferred embodiment, also the identified speaker model $S_2$ is updated based on the cluster of audio segments if the probability is higher than the target probability, such as $C_2>T$. For instance, the speaker model $S_2$ is updated based on feature vectors, such as MFCCs derived from the cluster of audio segments, e.g., $S_2$=FUNCTION(MFCC), wherein FUNCTION(.) represents updating of the speaker model.

Any measure or parameter that represents a confidence, reliability or uncertainty of the SR to correctly identify the identity of a speaker or the group affiliation of a speaker can be used as confidence measure according to the embodiments. Non-limiting examples include so-called likelihood scores and posterior probabilities.

Reynolds, Comparison of background normalization methods for text-independent speaker verification, Proceedings of the European Conference on Speech Communication and Technology, 1997, 2: 963-966 discloses a method of calculating confidence measures in the case decisions are made on likelihood scores. If the speaker recognition process instead calculates posterior probabilities and not likelihood there is no need to create likelihood ratios by normalization with another model since the posterior probability defines how confident the speaker recognition is, i.e., close to 1—very confident and close to 0—very uncertain.

FIG. 8 is a flow chart illustrating additional, optional steps of the method. The method continues from step S2 in FIG. 1 or from step S3 in FIG. 5. This embodiment comprises creating, in step S40, a new speaker model if a respective confidence measure calculated for each speaker model of the at least one speaker model represents a respective probability that is not higher than the target probability. This embodiment preferably comprises updating, in step S41, a default user profile based on the user preference associated with the cluster of audio segments model if the respective confidence measure calculated for each speaker model of the at least one speaker model represents a respective probability that is not higher than the target probability. Steps S40 and S41 can be performed serially in any order or at least partly in parallel. A following step S42 comprises associating the updated default profile with the new speaker model.

Hence, if none of the calculated confidence measures represents a sufficiently high probability, i.e., higher than the target probability, no updating of existing speaker models or existing user profiles is preferably performed. With regard to the example above with four family members, this situation corresponds to the case when max($C_1, C_2, C_3, C_4$) T, i.e., the largest probability calculated for the cluster of audio segments using the existing speaker models, $S_1, S_2, S_3, S_4$, is still not higher than the target probability.

Instead of incorrectly updating existing speaker models and user profiles in a situation with unreliable confidence measures, which might have the consequences of updating a user's user profile with user preferences of another user and updating a user's speaker model with voice characteristics of another user, a new speaker model is created and a default user profile is updated in steps S40 and S41. This thereby corresponds to a situation in which the SR algorithm has detected a potential new user of the user equipment, for which the SR algorithm does not have any generated speaker model.

The new speaker model created in step S40 may, in an embodiment, be created by deriving a GMM that models the distribution of feature vectors, such as MFCCs, extracted from the cluster of audio segment. The reliability of this newly created speaker model is generally quite low unless a lot of audio segments are initially available to create the speaker model. However, as the same user more and more uses voice control to control the user equipment, the speaker model can be updated over time to more correctly represent the characteristics of the user's voice, such as represented by the MFCCs.

The default user profile updated in step S41 is preferably a predefined user profile having equal weights for each alternative of a user preference. For instance, assume that the default user profile comprises three types of user preferences and that the first type of user preference has five different alternatives, the second type of user preference has two different alternatives and the third type of user preference has four different alternatives then the default user profile could be according to $P_{default}=[\{0.20, 0.20, 0.20, 0.20, 0.20\}, \{0.50, 0.50\}, \{0.25, 0.25, 0.25, 0.25\}]$.

The user preferences associated with the cluster of audio segments are then used to update this default user profile in step S41. This means that after the initial update of the user profile the updated default user profile will more correctly represent the user preferences of the new user as compared to the default preferences in the default user profile.

The association of the updated default user profile and the new speaker model in step S42 could be achieved according to various embodiments. For instance, the SR algorithm could store the updated default user profile and the new speaker model together in a memory so that the SR algorithm could retrieve them given information of either of them.

In an embodiment, each speaker model and speaker known to the SR algorithm could have an assigned speaker identifier. In such a case, this speaker identifier is preferably assigned to both the updated default user profile and the new speaker model. This means that the association between the updated default user profile and the new speaker model is the assigned speaker identifier.

The embodiments achieve an automatic speaker adaptation of voice-controlled user equipment without enrollment sessions. This is achieved through continuous learning of the users' voices, preferably based on speaker diarization, and continuous adaptation of user preferences associated with a particular voice. Since the enrollment session is completely avoided and the SR algorithm continuously updates the speaker models, the embodiments are more user friendly and at the same time more robust due to more accurate modeling of voice and acoustic environment variability.

As a user equipment, such as a set-top box, is being used, speaker diarization gradually accumulates audio recordings and clusters the unknown voices. True identity of the voices is not initially known, but instead a particular label may be assigned to all audio segments spoken by one person. User equipment settings, searches, preferred movie genre, favorite shows and actors, and other user preferences corresponding to a particular speaker are aggregated and associated with that speaker. This is achieved by associating the search or initiation of a playout session or other command with the label of the active speaker.

Initially a default configuration may be used for an unknown voice. After a period of accumulating and clustering audio recordings, separation of voices becomes reliable and the SR algorithm could go out of a default mode and switch to specific configurations associated with that voice.

The initial learning is preferably based on speaker diarization, which includes speaker change detection and speaker segmentation steps. The goal of speaker diarization is to produce time segments of audio signal that track activity of different speakers. Speaker change could be detected even without prior information about the speakers.

First, speech active segments, from the incoming audio stream, are detected by means of VAD. Next, a set of feature vectors are extracted. These feature vectors capture short-term frequency characteristics of the audio waveform. For example, a set of MFCCs are extracted every 10 ms. Changes of the statistics of the features sets that belong to the left and correspondingly to the right side of a sliding window of size few 10 seconds are used to detect potential speaker change points in the middle of the window.

Audio segments formed in the speaker change detection step are initially clustered, e.g., by means of k-means clustering algorithm, to form the initial voices partitioning. With accumulation of more audio samples a GMM is used to model the distributions of feature for each individual voice. Once the GMMs for individual speakers are available, blind speaker diarization is not required and new feature vectors are tested against each speaker model. The best matching model is selected to determine the speaker identity.

The above described learning determines a list of distinct users, i.e., users with distinct voices, $Sl_i$. Assume a list consisting of four speakers, likely corresponding to four family members $\{Sl_1, Sl_2, Sl_3, Sl_4\}$. We have also the corresponding four models $\{GMM_1, GMM_2, GMM_3, GMM_4\}$, which allow distinct voices to be detected in the audio stream. We also associate specific user profiles $\{P_1, P_2, P_3, P_4\}$ with the individual voices.

The top-level concept is illustrated in FIG. 10. The spectral features extracted from the continuous audio stream are tested against the existing speaker models $\{GMM_1, GMM_2, GMM_3, GMM_4\}$, and the best match determines the speaker identity $Sl_i$. Next, audio features collected over that time interval are used to update the speaker model $GMM_i$, such as by means of incremental k-means clustering or incremental Expectation-Maximization algorithm, and user preferences for the same time window, i.e., cluster of audio segments, are used to update the user profile $P_i$.

FIG. 9 is a flow chart illustrating a method of managing user profiles according to another embodiment. This embodiment comprises performing speaker diarization in step S50 on an audio stream to form at least one cluster of audio segments. Each cluster of audio segments comprises speech of a single speaker. This step S50 can be performed as previously described in connection with step S1 in FIG. 2. The following two steps S51 and S52 are preferably performed for each cluster of audio segments of the at least one cluster of audio segments, which is schematically represented by the line L2.

Step S51 comprises creating a new speaker model representing or modelling a speaker of the cluster of audio segments. This step S51 can be performed as previously described in connection with step S40 in FIG. 8. Step S52, which can be performed after or before step S51 or at least partly in parallel with step S51, comprises updating a default user profile based on a user preference assigned to the cluster of audio segments. This step S51 can be performed as previously described in connection with step S41 in FIG. 8.

The embodiment shown in FIG. 9 is preferably performed to initiate speak recognition at a user equipment. Hence, in this case the SR algorithm does not have access to any previously created speaker models nor has it any updated user profiles. This means that no confidence measures can be calculated since there are no speaker models to test the cluster of audio segments against. The embodiment shown in FIG. 9 thereby corresponds to so-called blind speaker diarization.

In an embodiment, step S50 is preferably performed as previously described in connection with FIG. 3, i.e., comprises the steps S10 to S12.

In an embodiment, the embodiment as shown in FIG. 9 also comprises assignment of user preferences as shown in FIG. 5, and which may be implemented as shown in FIG. 6.

Figure 11:
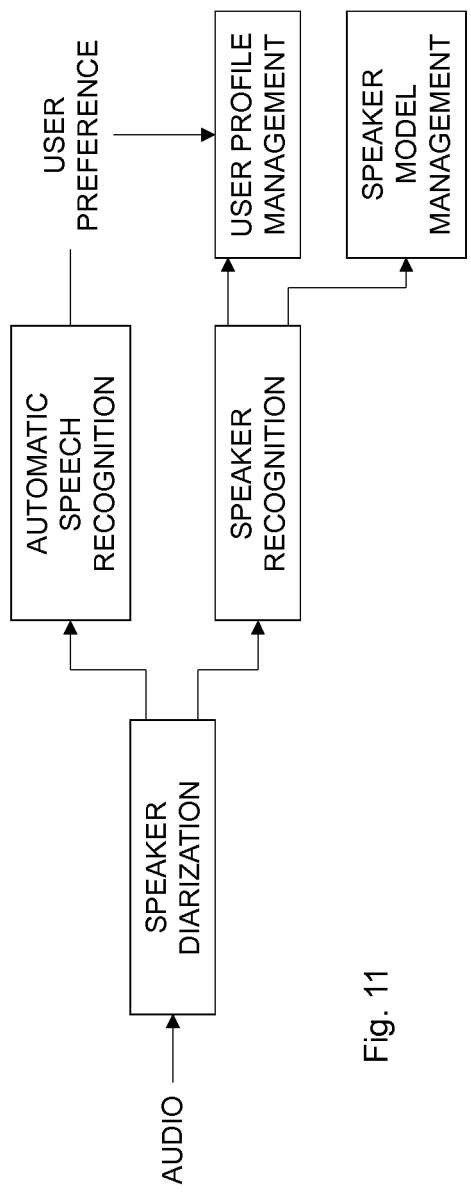
FIG. 11 schematically illustrates an embodiment of managing user profiles.

FIG. 11 schematically illustrates an embodiment of managing user profiles. This embodiment illustrates an audio stream that is input and subject to speaker diarization. The output of the speaker diarization are clusters of audio segments comprising speech of a single speaker. The clusters of audio segments are processed in a speaker recognition to determine the identities of the speakers. The output of the speaker recognition is then a respective user or speaker identifier of the most likely speaker together with the confidence measure for that user.

The clusters of audio segments output from the speaker diarization are also input to an automatic speech recognition in order to analyze what is said by the speakers for the purpose of identifying any user preferences.

The output of the automatic speech recognition is the identified user preferences. The user identifier is used together with the confidence measure in the user profile management. In more detail, a user profile is identified, such as based on the user identifier. The selected user profile may then be updated based on the user preferences output from the automatic speech recognition if the confidence measure represents a sufficiently high probability, i.e., higher than the target probability. Correspondingly, the speaker model of the identified user or speaker may be updated in a speaker model management if the confidence measure represents a sufficiently high probability.

Another aspect of the embodiments relates to a device for managing user profiles. The device is configured to calculate, for each speaker model of at least one speaker model, a confidence measure representing a probability that the speaker model represents a speaker of a cluster of audio segments. The device is also configured to update a user profile associated with the speaker model based on a user preference assigned to the cluster of audio segments if the confidence measure calculated for the speaker model represents a probability that is higher than a target probability.

In an embodiment, the device is configured to perform speaker diarization on an audio stream to form at least one cluster of audio segments. Each cluster of audio segments comprises speech of a single speaker.

In a particular embodiment, the device is configured to detect speech active segments from the audio stream. The device is also configured to detect speaker change points in the speech active segments to form audio segments of a single speaker. The device is further configured to cluster audio segments of a same single speaker to form the at least one cluster of audio segments.

In an embodiment, the device is configured to update the speaker model based on the cluster of audio segments if the confidence measure calculated for the speaker model represents a probability that is higher than the target probability.

In an embodiment, the device is configured to assign the user preference to the cluster of audio segments.

In a particular embodiment, the device is configured to perform automatic speech recognition on the cluster of audio segments to identify the user preference. The device is also configured to assign the identified user preference to the cluster of audio segments.

In an embodiment, the device is configured to calculate, for each speaker model of multiple speaker models, a confidence measure representing a probability that the speaker model represents the speaker of the cluster of audio segments. The device is also configured to identify a speaker model of the multiple speaker models for which the calculated confidence measure represents a highest probability among the calculated confidence measures. The device is further configured to update a user profile associated with the identified speaker model based on the user preference assigned to the cluster of audio segments if the confidence measure calculated for the identified speaker model represents a probability that is higher than the target probability.

In an embodiment, the device is configured to create a new speaker model if a respective confidence measure calculated for each speaker model of the at least one speaker model represents a respective probability that is not higher than the target probability. The device is also configured to update a default user profile based on the user preference associated with the cluster of audio segments if the respective confidence measure calculated for each speaker model of the at least one speaker model represents a respective probability that is not higher than the target probability. The device is further configured to associate the updated default user profile with the new speaker model.

A further aspect of the embodiments relates to a device for managing user profiles. The device is configured to perform speaker diarization on an audio stream to form at least one cluster of audio segments. Each cluster of audio segments comprises speech of a single speaker. The device is also configured to create, for each cluster of audio segments of the at least one cluster of audio segments, a new speaker model representing or modelling a speaker of the cluster of audio segments. The device is further configured to update, for each cluster of audio segments of the at least one cluster of audio segments, a default user profile based on a user preference assigned to the cluster of audio segments.

It will be appreciated that the methods, method steps and devices, device functions described herein can be implemented, combined and re-arranged in a variety of ways.

For example, embodiments may be implemented in hardware, or in software for execution by suitable processing circuitry, or a combination thereof.

The steps, functions, procedures, modules and/or blocks described herein may be implemented in hardware using any conventional technology, such as discrete circuit or integrated circuit technology, including both general-purpose electronic circuitry and application-specific circuitry.

Alternatively, or as a complement, at least some of the steps, functions, procedures, modules and/or blocks described herein may be implemented in software such as a computer program for execution by suitable processing circuitry such as one or more processors or processing units.

Examples of processing circuitry includes, but is not limited to, one or more microprocessors, one or more Digital Signal Processors (DSPs), one or more Central Processing Units (CPUs), video acceleration hardware, and/or any suitable programmable logic circuitry such as one or more Field Programmable Gate Arrays (FPGAs), or one or more Programmable Logic Controllers (PLCs).

It should also be understood that it may be possible to re-use the general processing capabilities of any conventional device or unit in which the proposed technology is implemented. It may also be possible to re-use existing software, e.g., by reprogramming of the existing software or by adding new software components.

Figure 12:
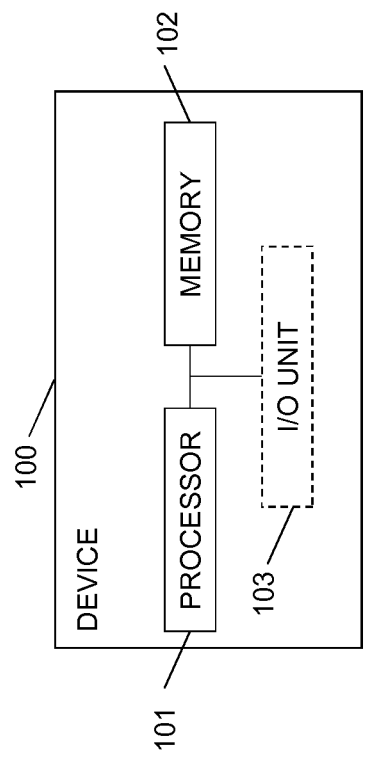
FIG. 12 is a schematic block diagram of a device for managing user profiles according to an embodiment.

FIG. 12 is a schematic block diagram illustrating an example of a device 100 for managing user profiles based on a processor-memory implementation according to an embodiment. In this particular example, the device 100 comprises a processor 101, such as processing circuitry, and a memory 102. The memory 102 comprises instructions executable by the processor 101.

In an embodiment, the processor 101 is operative to calculate the confidence measure and to update the user preference associated with the speaker if the confidence measure represents a probability that is higher than the target probability as previously described herein.

In another embodiment, the processor 101 is operative to perform speaker diarization, create the new speaker model and update the default user profile as previously described herein.

Optionally, the device 100 may also include a communication circuit, represented by an input/output (I/O) unit 103 in FIG. 12. The I/O unit 103 may include functions for wired and/or wireless communication with other devices and/or network nodes in a wired or wireless communication network. In a particular example, the I/O unit 103 may be based on radio circuitry for communication with one or more other nodes, including transmitting and/or receiving information. The I/O unit 103 may be interconnected to the processor 101 and/or memory 102. By way of example, the I/O unit 103 may include any of the following: a receiver, a transmitter, a transceiver, I/O circuitry, input port(s) and/or output port(s).

Figure 13:
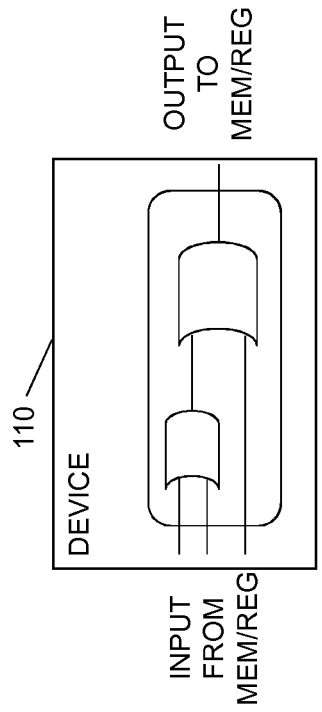
FIG. 13 is a schematic block diagram of a device for managing user profiles according to another embodiment.

FIG. 13 is a schematic block diagram illustrating another example of a device 110 for managing user profiles based on a hardware circuitry implementation according to an embodiment. Particular examples of suitable hardware circuitry include one or more suitably configured or possibly reconfigurable electronic circuitry, e.g., Application Specific Integrated Circuits (ASICs), FPGAs, or any other hardware logic such as circuits based on discrete logic gates and/or flip-flops interconnected to perform specialized functions in connection with suitable registers (REG), and/or memory units (MEM).

Figure 14:
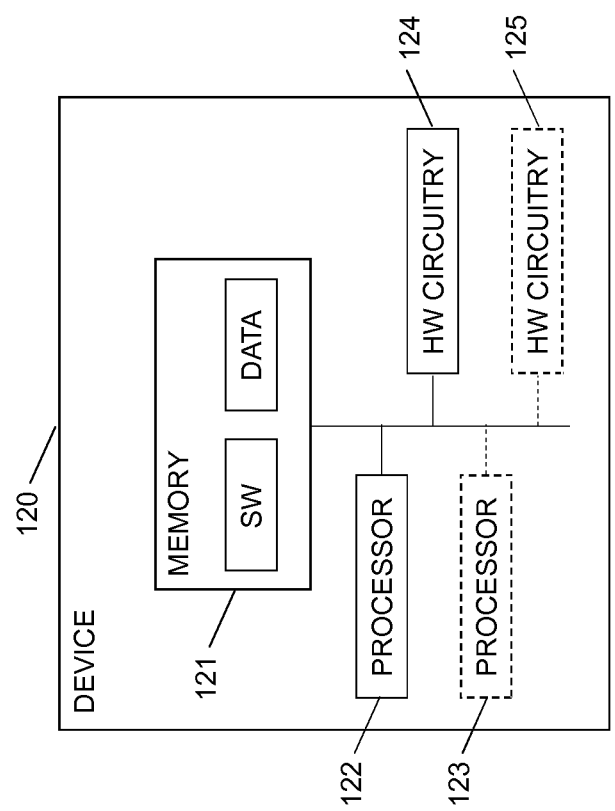
FIG. 14 is a schematic block diagram of a device for managing user profiles according to a further embodiment.

FIG. 14 is a schematic block diagram illustrating yet another example of a device 120 for managing user profiles based on combination of both processor(s) 122, 123 and hardware circuitry 124, 125 in connection with suitable memory unit(s) 121. The device 120 comprises one or more processors 122, 123, memory 121 including storage for software (SW) and data, and one or more units of hardware circuitry 124, 125. The overall functionality is thus partitioned between programmed software for execution on one or more processors 122, 123, and one or more pre-configured or possibly reconfigurable hardware circuits 124, 125. The actual hardware-software partitioning can be decided by a system designer based on a number of factors including processing speed, cost of implementation and other requirements.

Figure 15:
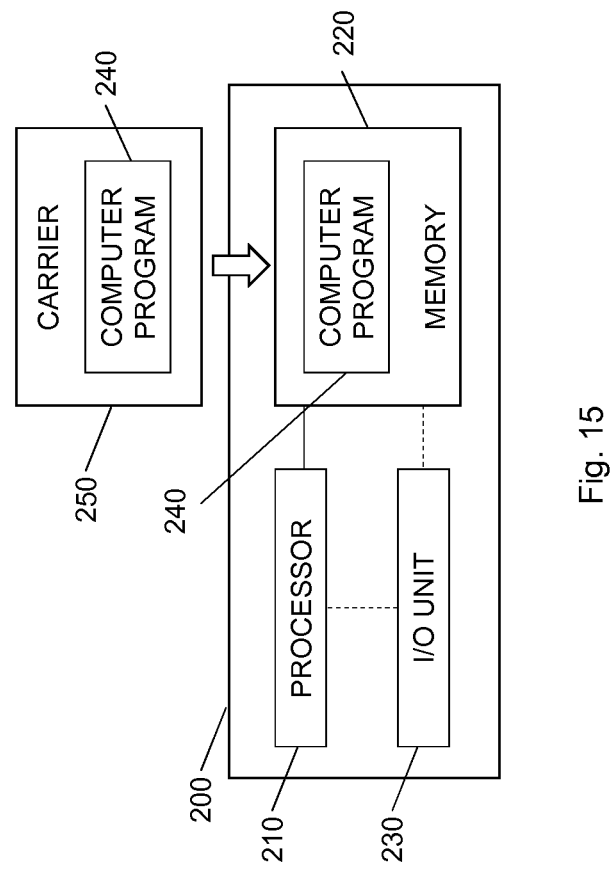
FIG. 15 is a schematic block diagram of a computer program based implementation of an embodiment.

FIG. 15 is a schematic diagram illustrating an example of a device 200 for managing user profiles according to an embodiment. In this particular example, at least some of the steps, functions, procedures, modules and/or blocks described herein are implemented in a computer program 240, which is loaded into the memory 220 for execution by processing circuitry including one or more processors 210. The processor(s) 210 and memory 220 are interconnected to each other to enable normal software execution. An optional I/O unit 230 may also be interconnected to the processor(s) 210 and/or the memory 220 to enable input and/or output of relevant data, such as audio streams, audio segments, user profiles.

The term 'processor' should be interpreted in a general sense as any circuitry, system or device capable of executing program code or computer program instructions to perform a particular processing, determining or computing task.

The processing circuitry including one or more processors 210 is thus configured to perform, when executing the computer program 240, well-defined processing tasks such as those described herein.

The processing circuitry does not have to be dedicated to only execute the above-described steps, functions, procedure and/or blocks, but may also execute other tasks.

In an embodiment, the computer program 240 comprises instructions, which when executed by at least one processor 210, cause the at least one processor 210 to calculate, for each speaker model of at least one speaker model, a confidence measure representing a probability that the speaker model represents a speaker of a cluster of audio segments. The at least one processor 210 is also caused to update a user profile associated with the speaker model based on a user preference assigned to the cluster of audio segments if the confidence measure calculated for the speaker model represents a probability that is higher than a target probability.

In another embodiment, the computer program 240 comprises instructions, which when executed by at least one processor 210, cause the at least one processor 210 to perform speaker diarization on an audio stream to form at least one cluster of audio segments. Each cluster of audio segments comprises speech of a single speaker. The at least one processor 210 is also caused to create, for each cluster of audio segments of the at least one cluster of audio segments, a new speaker model representing or modelling a speaker of the cluster of audio segments. The at least one processor 210 is further caused to update, for each cluster of audio segments of the at least one cluster of audio segments, a default user profile based on a user preference assigned to the cluster of audio segments.

The proposed technology also provides a carrier 250 comprising the computer program 240. The carrier 250 is one of an electronic signal, an optical signal, an electromagnetic signal, a magnetic signal, an electric signal, a radio signal, a microwave signal, or a computer-readable storage medium.

By way of example, the software or computer program 240 may be realized as a computer program product, which is normally carried or stored on a computer-readable medium 250, in particular a non-volatile medium. The computer-readable medium may include one or more removable or non-removable memory devices including, but not limited to a Read-Only Memory (ROM), a Random Access Memory (RAM), a Compact Disc (CD), a Digital Versatile Disc (DVD), a Blu-ray disc, a Universal Serial Bus (USB) memory, a Hard Disk Drive (HDD) storage device, a flash memory, a magnetic tape, or any other conventional memory device. The computer program 240 may thus be loaded into the operating memory 220 of a device 200 for execution by the processing circuitry 210 thereof.

The flow diagram or diagrams presented herein may be regarded as a computer flow diagram or diagrams, when performed by one or more processors. A corresponding device may be defined as a group of function modules, where each step performed by the processor corresponds to a function module. In this case, the function modules are implemented as a computer program running on the processor.

The computer program residing in memory may, thus, be organized as appropriate function modules configured to perform, when executed by the processor, at least part of the steps and/or tasks described herein.

Figure 16:
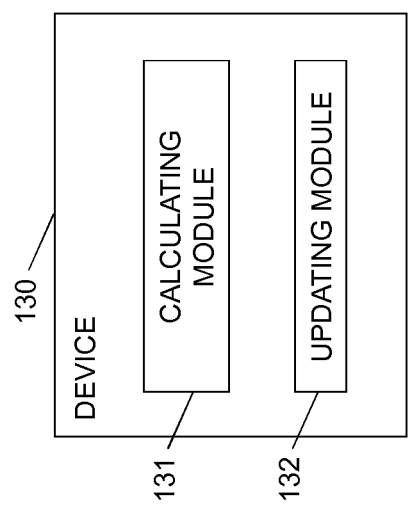
FIG. 16 is a schematic block diagram of a device for managing user profiles according to yet another embodiment.

FIG. 16 is a schematic block diagram of a device 130 for managing user profiles according to an embodiment. The device 130 comprises a calculating module 131 for calculating, for each speaker model of at least one speaker model, a confidence measure representing a probability that the speaker model represents a speaker of a cluster of audio segments. The device 130 also comprises an updating module 132 for updating a user profile associated with the speaker model based on a user preference assigned to the cluster of audio segments if the confidence measure calculated for the speaker model represents a probability that is higher than a target probability.

Figure 17:
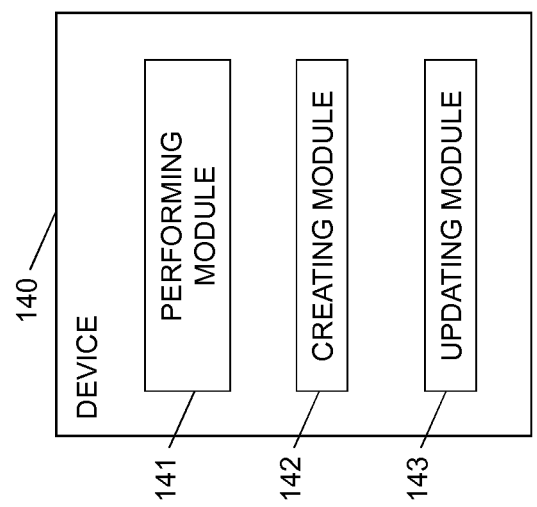
FIG. 17 is a schematic block diagram of a device for managing user profiles according to a further embodiment.

FIG. 17 is a schematic block diagram of a device 140 for managing user profiles according to another embodiment. The device 140 comprises a diarization module 141 for performing speaker diarization on an audio stream to form at least one cluster of audio segments. Each cluster of audio segments comprises speech of a single speaker. The device 140 also comprises a creating module 142 for creating, for each cluster of audio segments of the at least one cluster of audio segments, a new speaker model representing or modelling a speaker of the cluster of audio segments. The device 140 further comprises an updating module 143 for updating, for each cluster of audio segments of the at least one cluster of audio segments, a default user profile based on a user preference assigned to the cluster of audio segments.

Figure 18:
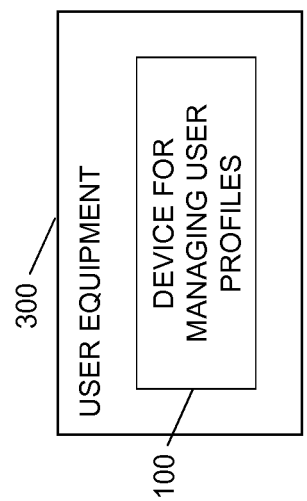
FIG. 18 is a schematic block diagram illustrating a user equipment according to an embodiment.

A further aspect of the embodiments, see FIG. 18, relates to a user equipment 300 comprising a device 100 for managing user profiles according to any of the embodiments, such as disclosed herein in connection with FIGS. 12 to 17. In an embodiment, the user equipment is selected from a group consisting of a computer, a laptop, a smart phone, a mobile phone, a tablet, an audio player, a multimedia player, a set-top box, and a game console. In a particular embodiment, the user equipment is intended to be installed in a home environment and is preferably a set-top box or a game console.

It is also becoming increasingly popular to provide computing services (hardware and/or software) in network devices, such as network nodes and/or servers where the resources are delivered as a service to remote locations over a network. By way of example, this means that functionality, as described herein, can be distributed or re-located to one or more separate physical nodes or servers. The functionality may be re-located or distributed to one or more jointly acting physical and/or virtual machines that can be positioned in separate physical node(s), i.e., in the so-called cloud. This is sometimes also referred to as cloud computing, which is a model for enabling ubiquitous on-demand network access to a pool of configurable computing resources such as networks, servers, storage, applications and general or customized services.

There are different forms of virtualization that can be useful in this context, including one or more of:

Consolidation of network functionality into virtualized software running on customized or generic hardware. This is sometimes referred to as network function virtualization.

Co-location of one or more application stacks, including operating system, running on separate hardware onto a single hardware platform. This is sometimes referred to as system virtualization, or platform virtualization.

Co-location of hardware and/or software resources with the objective of using some advanced domain level scheduling and coordination technique to gain increased system resource utilization. This is sometimes referred to as resource virtualization, or centralized and coordinated resource pooling.

Although it may often desirable to centralize functionality in so-called generic data centers, in other scenarios it may in fact be beneficial to distribute functionality over different parts of the network.

A network device may generally be seen as an electronic device being communicatively connected to other electronic devices in the network. By way of example, the network device may be implemented in hardware, software or a combination thereof. For example, the network device may be a special-purpose network device or a general purpose network device, or a hybrid thereof.

A special-purpose network device may use custom processing circuits and a proprietary operating system (OS), for execution of software to provide one or more of the features or functions disclosed herein.

A general purpose network device may use common off-the-shelf (COTS) processors and a standard OS, for execution of software configured to provide one or more of the features or functions disclosed herein.

By way of example, a special-purpose network device may include hardware comprising processing or computing resource(s), which typically include a set of one or more processors, and physical network interfaces (NIs), which sometimes are called physical ports, as well as non-transitory machine readable storage media having stored thereon software. A physical NI may be seen as hardware in a network device through which a network connection is made, e.g. wirelessly through a wireless network interface controller (WNIC) or through plugging in a cable to a physical port connected to a network interface controller (NIC). During operation, the software may be executed by the hardware to instantiate a set of one or more software instance(s). Each of the software instance(s), and that part of the hardware that executes that software instance, may form a separate virtual network element.

By way of another example, a general purpose network device may, for example, include hardware comprising a set of one or more processor(s), often COTS processors, and network interface controller(s) (NICs), as well as non-transitory machine readable storage media having stored thereon software. During operation, the processor(s) executes the software to instantiate one or more sets of one or more applications. While one embodiment does not implement virtualization, alternative embodiments may use different forms of virtualization—for example represented by a virtualization layer and software containers. For example, one such alternative embodiment implements operating system-level virtualization, in which case the virtualization layer represents the kernel of an operating system, or a shim executing on a base operating system, that allows for the creation of multiple software containers that may each be used to execute one of a sets of applications. In an example embodiment, each of the software containers, also called virtualization engines, virtual private servers, or jails, is a user space instance, typically a virtual memory space. These user space instances may be separate from each other and separate from the kernel space in which the operating system is executed; the set of applications running in a given user space, unless explicitly allowed, cannot access the memory of the other processes. Another such alternative embodiment implements full virtualization, in which case: 1) the virtualization layer represents a hypervisor, sometimes referred to as a Virtual Machine Monitor (VMM), or the hypervisor is executed on top of a host operating system; and 2) the software containers each represent a tightly isolated form of software container called a virtual machine that is executed by the hypervisor and may include a guest operating system.

A hypervisor is the software/hardware that is responsible for creating and managing the various virtualized instances and in some cases the actual physical hardware. The hypervisor manages the underlying resources and presents them as virtualized instances. What the hypervisor virtualizes to appear as a single processor may actually comprise multiple separate processors. From the perspective of the operating system, the virtualized instances appear to be actual hardware components.

A virtual machine is a software implementation of a physical machine that runs programs as if they were executing on a physical, non-virtualized machine; and applications generally do not know they are running on a virtual machine as opposed to running on a "bare metal" host electronic device, though some systems provide para-virtualization which allows an operating system or application to be aware of the presence of virtualization for optimization purposes.

The instantiation of the one or more sets of one or more applications as well as the virtualization layer and software containers if implemented, are collectively referred to as software instance(s). Each set of applications, corresponding software container if implemented, and that part of the hardware that executes them (be it hardware dedicated to that execution and/or time slices of hardware temporally shared by software containers), forms a separate virtual network element(s).

The virtual network element(s) may perform similar functionality compared to Virtual Network Element(s) (VNEs). This virtualization of the hardware is sometimes referred to as Network Function Virtualization (NFV)). Thus, NFV may be used to consolidate many network equipment types onto industry standard high volume server hardware, physical switches, and physical storage, which could be located in data centers, NDs, and Customer Premise Equipment (CPE). However, different embodiments may implement one or more of the software container(s) differently. For example, while embodiments are illustrated with each software container corresponding to a VNE, alternative embodiments may implement this correspondence or mapping between software container-VNE at a finer granularity level; it should be understood that the techniques described herein with reference to a correspondence of software containers to VNEs also apply to embodiments where such a finer level of granularity is used.

According to yet another embodiment, there is provided a hybrid network device, which includes both custom processing circuitry/proprietary OS and COTS processors/standard OS in a network device, e.g. in a card or circuit board within a network device ND. In certain embodiments of such a hybrid network device, a platform Virtual Machine (VM), such as a VM that implements functionality of a special-purpose network device, could provide for para-virtualization to the hardware present in the hybrid network device.

Figure 19:
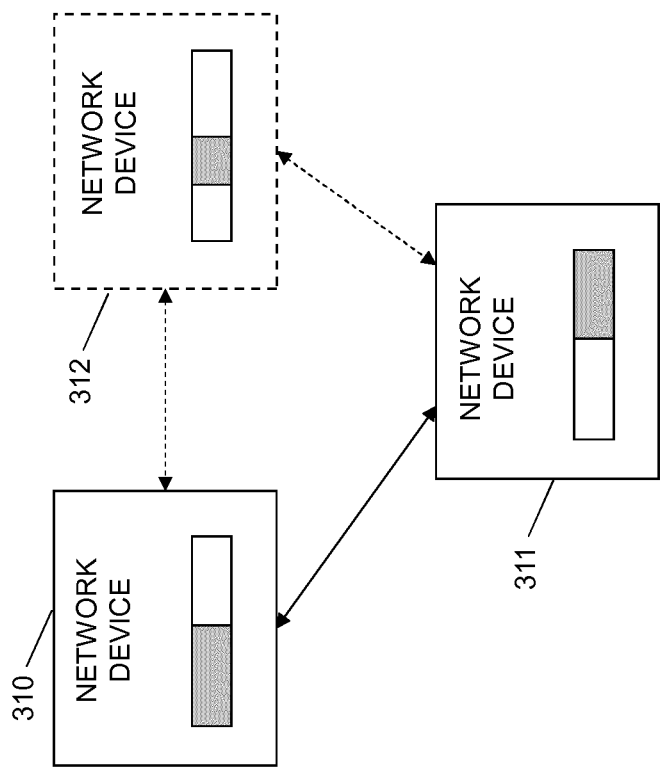
FIG. 19 schematically illustrates a distributed implementation among multiple network devices.

FIG. 19 is a schematic diagram illustrating an example of how functionality can be distributed or partitioned between different network devices in a general case. In this example, there are at least two individual, but interconnected network devices 310, 311, which may have different functionalities, or parts of the same functionality, partitioned between the network devices 310, 311. There may be additional network device 312 being part of such a distributed implementation. The network devices 300, 311, 312 may be part of the same wireless or wired communication system, or one or more of the network devices may be so-called cloud-based network devices located outside of the wireless or wired communication system.

The embodiments described above are to be understood as a few illustrative examples of the present invention. It will be understood by those skilled in the art that various modifications, combinations and changes may be made to the embodiments without departing from the scope of the present invention. In particular, different part solutions in the different embodiments can be combined in other configurations, where technically possible. The scope of the present invention is, however, defined by the appended claims.

The invention claimed is:

1. A method of managing user profiles, comprising:
   calculating, for each speaker model of a plurality of speaker models, a confidence measure representing a probability that the speaker model represents a speaker of a cluster of audio segments; and
   responsive to the confidence measures of two or more of the speaker models representing probabilities that are each higher than a target probability, updating each of a plurality of user profiles based on a user preference assigned to the cluster of audio segments, each updated user profile being associated with a respective one of the two or more speaker models.

2. The method of claim 1, further comprising performing speaker diarization on an audio stream to form at least one cluster of audio segments, wherein each cluster of audio segments comprises speech of a single speaker.

3. The method of claim 2, wherein the performing speaker diarization comprises:
   detecting speech active segments from the audio stream;
   detecting speaker change points in the speech active segments to form audio segments of a single speaker; and
   clustering audio segments of a same single speaker to form the at least one cluster of audio segments.

4. The method of claim 1, further comprising updating the two or more speaker models based on the cluster of audio segments in response to the confidence measures calculated for the two or more speaker models each representing a probability that is higher than the target probability.

5. The method of claim 1, further comprising assigning the user preference to the cluster of audio segments.

6. The method of claim 5, wherein the assigning the user preference comprises:
   performing automatic speech recognition on the cluster of audio segments to identify the user preference; and
   assigning the identified user preference to the cluster of audio segments.

7. The method of claim 5, wherein the user preference is selected from a group consisting of: a genre of a media, a name of a singer or band, a name of an actor or actress, a name of a director, a name of a sport team or athlete, a user equipment setting, and a web site address.

8. The method of claim 1, further comprising identifying a speaker model of the two or more speaker models for which the calculated confidence measure represents a highest probability among the calculated confidence measures.

9. The method of claim 1, further comprising:
calculating, for each of the plurality of speaker models, a further confidence measure representing a further probability that the speaker model represents a speaker of a further cluster of audio segments;
responsive to each of the further confidence measures representing a respective further probability that is not higher than the target probability:
creating a new speaker model;
updating a default user profile based on a user preference associated with the further cluster of audio segments; and
associating the updated default user profile with the new speaker model.

10. A device for managing user profiles, comprising:
processing circuitry;
memory containing instructions executable by the processing circuitry whereby the device is operative to:
calculate, for each speaker model of a plurality of speaker models, a confidence measure representing a probability that the speaker model represents a speaker of a cluster of audio segments; and
responsive to the confidence measures of two or more of the speaker models representing probabilities that are each higher than a target probability, update each of a plurality of user profiles based on a user preference assigned to the cluster of audio segments, each updated user profile being associated with a respective one of the two or more speaker models.

11. The device of claim 10, wherein the instructions are such that the device is operative to perform speaker diarization on an audio stream to form at least one cluster of audio segments, wherein each cluster of audio segments comprises speech of a single speaker.

12. The device of claim 11, wherein the instructions are such that the device is operative to:
detect speech active segments from the audio stream;
detect speaker change points in the speech active segments to form audio segments of a single speaker; and
cluster audio segments of a same single speaker to form the at least one cluster of audio segments.

13. The device of claim 10, wherein the instructions are such that the device is operative to update the two or more speaker models based on the cluster of audio segments in response to the confidence measures calculated for the two or more speaker models each representing a probability that is higher than the target probability.

14. The device of claim 10, wherein the instructions are such that the device is operative to assign the user preference to the cluster of audio segments.

15. The device of claim 14, wherein the instructions are such that the device is operative to:
perform automatic speech recognition on the cluster of audio segments to identify the user preference; and
assign the identified user preference to the cluster of audio segments.

16. The device of claim 10, wherein the instructions are such that the device is further operative to identify a speaker model of the two or more speaker models for which the calculated confidence measure represents a highest probability among the calculated confidence measures.

17. The device of claim 10, wherein the instructions are such that the device is operative to:
calculate, for each of the plurality of speaker models, a further confidence measure representing a further probability that the speaker model represents a speaker of a further cluster of audio segments;
responsive to each of the further confidence measures representing a respective further probability that is not higher than the target probability:
create a new speaker model;
update a default user profile based on a user preference associated with the further cluster of audio segments; and
associate the updated default user profile with the new speaker model.

* * * * *